United States Patent
Boyles et al.

(10) Patent No.: US 7,576,639 B2
(45) Date of Patent: Aug. 18, 2009

(54) SYSTEMS AND METHODS FOR DETECTING PEDESTRIANS IN THE VICINITY OF A POWERED INDUSTRIAL VEHICLE

(75) Inventors: Tonnie Michael Boyles, Louisville, MS (US); Matthew Craig Hillyer, Louisville, MS (US); Meny Benady, Tel Aviv (IL); Erez Dagan, Rehovot (IL); Yoram Gdalyahu, Jerusalem (IL); Eran Herzberg, Tel Aviv (IL)

(73) Assignees: Mobileye Technologies, Ltd., Nicosia (CY); Taylor Machine Works, Louisville, MS (US)

( * ) Notice: Subject to any disclaimer, the term of this patent is extended or adjusted under 35 U.S.C. 154(b) by 342 days.

(21) Appl. No.: 11/685,208

(22) Filed: Mar. 13, 2007

(65) Prior Publication Data

US 2007/0229238 A1    Oct. 4, 2007

Related U.S. Application Data

(60) Provisional application No. 60/781,652, filed on Mar. 14, 2006.

(51) Int. Cl.
*B60Q 1/00* (2006.01)
*H04N 7/18* (2006.01)

(52) U.S. Cl. .............. 340/435; 340/436; 340/425.5; 340/686.6; 340/944; 382/103; 348/135; 348/143; 348/153; 348/169

(58) Field of Classification Search .......... 340/435; 348/143, 135, 153
See application file for complete search history.

(56) References Cited

U.S. PATENT DOCUMENTS

| 6,396,535 | B1 * | 5/2002 | Waters ................ 348/159 |
| 2002/0094110 | A1 * | 7/2002 | Okada et al. ........... 382/104 |
| 2004/0234136 | A1 * | 11/2004 | Zhu et al. ............. 382/224 |

* cited by examiner

*Primary Examiner*—Donnie L Crosland
(74) *Attorney, Agent, or Firm*—The Law Office of Michael E. Kondoudis, PC

(57) ABSTRACT

A system mounted on a powered industrial vehicle for detecting classifying and tracking in real time at least one obstruction in the scene around the vehicle. The vehicle is capable of moving in multiple directions. The system includes a multiple cameras mounted on the vehicle, wherein the viewing zones viewed respectively by the cameras preferably encompass 360° horizontally around the vehicle. Each of the cameras is operatively attached to an image processor, which processes the image frames acquired respectively by the camera. When a pedestrian is present in the viewing zone viewed by one of the cameras, the image processor attached to the one camera identifies in at least one of the image frames at least a portion of an image of the detected pedestrian.

49 Claims, 12 Drawing Sheets

SYSTEMS AND METHODS FOR DETECTING PEDESTRIANS IN THE VICINITY OF A POWERED INDUSTRIAL VEHICLE

CROSS REFERENCE TO RELATED APPLICATIONS

This application claims the benefit under 35 USC 119(e) from U.S. provisional application 60/781,652 filed Mar. 14, 2006, the disclosure of which is included herein by reference.

FIELD OF THE INVENTION

The present invention relates to the detecting and identifying pedestrians around a powered industrial vehicle and more particularly the present invention detects and identifies pedestrians around a powered industrial vehicle using multiple cameras that provide images of the scene, preferably in an angle 360° (angular) around the powered industrial vehicle.

BACKGROUND OF THE INVENTION AND PRIOR ART

An operator of a powered industrial vehicle is required to notice pedestrians in the area around which the vehicle is operating. Prior art solutions for detecting pedestrians include the use of electromagnetic radiation emitters coupled with RADAR sensors, laser sensors, and/or SONAR (ultrasonic) sensors to provide the operator with some indication that a pedestrian may be present in the area around the vehicle.

A significant limitation of prior art systems is in the inability to discern whether the object being detected is an insignificant inanimate object (e.g. trash, boxes, poles, etc.) or a pedestrian. As a result, prior art systems alert the industrial truck operator of the presence of every object thereby creating multiple false alarms. These false alarms annoy the operator with unnecessary warnings, and cause the operator to be less sensitive to the warnings.

Furthermore, radar and laser sensors as well as ultrasound sensors have the disadvantage that in the immediate vehicle surroundings they are able to detect only a small region of the surroundings because of their small aperture angle, which typically provides a narrow FOV. Thus, a large number of sensors is required if the entire vehicle surroundings are to be detected using such sensors.

An example of a laser based system, is disclosed in U.S. Pat. No. 7,164,118 (hereinafter U.S. '118), by Anderson et al U.S. '118 discloses a method of detecting presence of an object and the distance between the system and an object using a laser mounted on an industrial vehicle. The transmitter emits linear beams of electromagnetic radiation with a transmitted radiation pattern within a defined spatial zone. A camera collects an image of the defined spatial zone. A data processor detects a presence of an object in the collected image based on an observed illumination radiation pattern on an object formed by at least one of the linear beams. A distance estimator estimates a distance between the object and the optical device.

There are also prior art systems using imaging devices to image the scene in an angle 360° horizontally around a vehicle. Such a system is disclosed in U.S. patent application 2004/0075544 (hereinafter U.S. '544), by Janssen Holger. U.S. '544 uses two optical sensors that act as a pair of stereo cameras. The sensors are coupled with fisheye lenses, which have a very wide-angle of 220°. Thus, a large portion of the surroundings of the motor vehicle may be detected but the very wide-angle lenses provide images with a large extend of distortion, and U.S. '544 does not disclose if the distortion is corrected. In U.S. '544 all sensors emit the sensed information to a single controller.

Tracking a detected pedestrian over time enables the system to detect a pedestrian at a relatively far distance from the vehicle, such as 15 meters or more, and then track the detected pedestrian with high confidence at a closer range, which might endanger the pedestrian and thus, the powered industrial vehicle driver will be warned by the system. Tracking also enables the system to stay locked on a detected pedestrian as the image of a detected pedestrian departs from a frame provided by one camera and enters a frame of an adjacent camera of the same system. Tracking of the detected pedestrian will then proceed using the second camera.

There are prior art systems, mounted in vehicles, for detecting pedestrians and for measuring the distance from the vehicle to the detected pedestrian. A pedestrian detection system is described in U.S. application Ser. No. 10/599,635 (hereinafter U.S. '635) by Shashua et al, the disclosure of which is included herein by reference for all purposes as if entirely set forth herein. U.S. '635 provides a system mounted on a host vehicle and methods for detecting pedestrians in an image frame, the image provided by a monocular camera.

A distance measurement from a visible camera image frame is described in "Vision based ACC with a Single Camera: Bounds on Range and Range Rate Accuracy" by Stein et al., presented at the IEEE Intelligent Vehicles Symposium (IV2003), the disclosure of which is incorporated herein by reference for all purposes as if entirely set forth herein. Distance measurement is further discussed in U.S. application Ser. No. 11/554,048 (hereinafter U.S. '048) by Stein et al., the disclosure of which is included herein by reference for all purposes as if entirely set forth herein. U.S. '048 provides methods for refining distance measurements from the vehicle hosting the distance measuring system, to an obstruction.

An obstruction detection and tracking system is described in U.S. Pat. No. 7,113,867 (hereinafter U.S. '867) by Stein, and included herein by reference for all purposes as if entirely set forth herein. Obstruction detection and tracking is performed based on information from multiple images captured in real time using a camera mounted in a vehicle hosting the obstruction detection and tracking system.

The systems disclosed in U.S. '635, U.S. '867 and U.S. '048, are typically part of a warning and/or control system for vehicles that are typically traveling forward on roads at relatively high speeds. They are not suitable to a powered industrial vehicle, such as a forklift, which typically travels off the road, at low speeds and in any directions. Thus, a powered industrial vehicle needs a warning system that can warn the driver of a pedestrian located anywhere near in the area around the powered industrial vehicle.

Thus, there is a need for and it would be advantageous to have a system including multiple cameras mounted on a powered industrial truck, each camera equipped with an image processing system for detecting pedestrians and in the system when one camera detects a pedestrian and the pedestrian moves out of the field of view (in horizontal plane) of the one camera, data is passed to the second camera so that the pedestrian is tracked using the multiple cameras over a wide field of view.

The term "powered industrial vehicle" as used herein refers to a vehicle selected from the group of vehicles including forklifts, container handlers, rubber tired gantry cranes. A powered industrial vehicle typically travels at a low speed, is capable of moving in multiple directions and frequently changes the traveling direction.

The term "Field Of View" (FOV) in general is the angular extent of a given scene, delineated by the angle of a three dimensional cone that is imaged onto an image sensor of a camera, the camera being the vertex of the three dimensional cone. The FOV of a camera at particular distances is determined by the focal length of the lens: the longer the focal length, the narrower the field of view. The terms "Field Of View" of a camera and "viewing zone" of a camera are used herein interchangeably and are used herein to refer to the horizontal angular extent of a given scene, as imaged on to the image sensor of the camera. It is assumed that the dimensions of the detector are adapted to the camera FOV.

SUMMARY OF THE INVENTION

According to the present invention there is provided a system mounted on a powered industrial vehicle for detecting classifying and tracking in real time at least one obstruction in the scene around the vehicle and method of use. The vehicle is capable of moving in multiple directions. The system includes multiple cameras mounted on the vehicle, wherein the viewing zones viewed respectively by the cameras preferably encompass 360° horizontally around the vehicle. Each of the cameras is operatively attached to an image processor, which processes the image frames acquired by the respective camera. When a pedestrian is present in the viewing zone viewed by one of the cameras, the image processor attached to the one camera identifies in at least one of the image frames at least a portion of an image of the detected pedestrian, thereby producing a detected pedestrian data object. The detected pedestrian data object includes one or more of the following features: distance, azimuth angle, size, time, color. The image processor computes the distance from the vehicle to the detected pedestrian and the azimuth to the detected pedestrian relative to the longitudinal axis of the vehicle. From a one time calibration procedure, the distance of each camera from the closest track external surface is measured and stored in the respective image processor and/or in the system processor. From a one time calibration procedure, the azimuth each camera optical axis relative to the longitudinal axis of the vehicle is measured and stored in the respective image processor and/or in the system processor.

The image processor continuously tracks the detected pedestrian while updating the computed distance from the vehicle to the detected pedestrian and the azimuth to the detected pedestrian relative to the longitudinal axis of the vehicle. The image processor transfers the detected pedestrian data object to a common bus interconnecting all image processors and the system processor wherein the image processor attaches an ID code to the detected pedestrian data object. Adjacent image processors can either read the detected pedestrian data object directly from the bus or receive it from the system processor.

Viewing zones of adjacent cameras are preferably overlapping. When the detected pedestrian enters an overlapping zone, i.e., the pedestrian is imaged by two adjacent cameras, respective image processors detect the obstruction, classify the obstruction as a pedestrian, measure the distance and azimuth to the detected pedestrian and continuously track the detected pedestrian. The system processor performs stereo analysis to refine the distance estimation to the detected pedestrian. The system processor notifies the vehicle operator interface on each detected pedestrian. The notification can be visual: lights, colored lights, display; and/or the notification can be audible: speakers. The speakers can be configured in a stereophonic configuration or in a surround configuration, indicating to the vehicle operator the direction to said detected pedestrian. The audible alarm to the operator is either constant in tone and/or loudness, or with a progressive increase in loudness and/or frequency as the pedestrian's proximity to vehicle decreases. The visual warning scheme can include, for example, indicating lights that turn from green to amber and from amber to red, as the pedestrian's proximity to vehicle decreases.

In embodiments of the present invention, an activation mechanism is operatively attached to the system processor, the activation mechanism causing the vehicle to slow down or stop, to avoid an accident.

In embodiments of the present invention, the system processor and one of the image processors are operated from a single processor.

In another method of the present invention, tracking of a detected pedestrian is performed by the system processor. This requires a higher frame rate transfer on the bus, when a pedestrian is detected.

In another method of the present invention, detection, classification and tracking of a detected pedestrian is performed by the system processor. This requires a much higher frame rate transfer on the bus, when a pedestrian is detected.

BRIEF DESCRIPTION OF THE DRAWINGS

The present invention will become fully understood from the detailed description given herein below and the accompanying drawings, which are given by way of illustration and example only and thus not limitative of lie present invention.

DETAILED DESCRIPTION OF THE INVENTION

Figure 1:
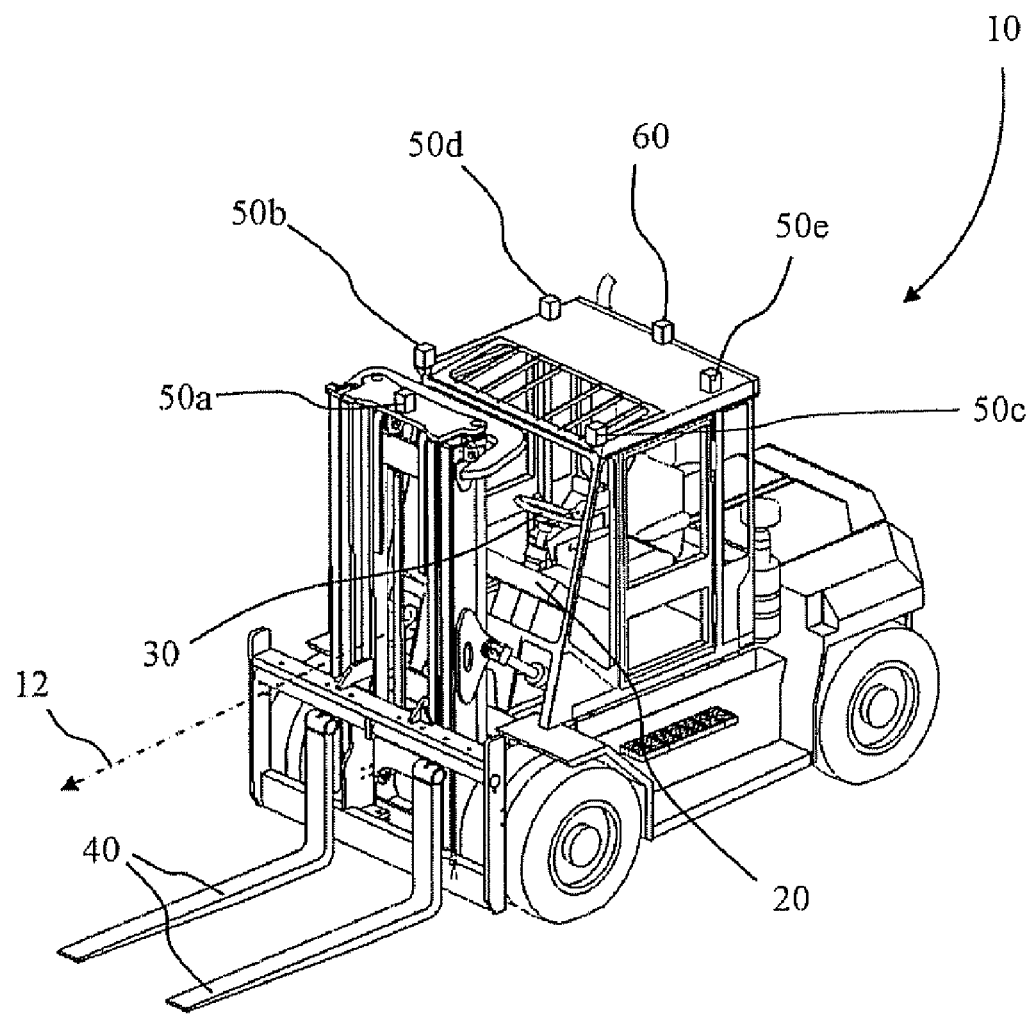
FIG. 1 is a perspective view of an embodiment of a pedestrian detection and tracking system of the present invention, configured with a powered industrial vehicle (in this case, a forklift vehicle).

The present invention is of a system mounted on a powered industrial vehicle and methods for detecting and classifying in real time an obstruction, in particular a pedestrian, around the powered industrial vehicle. The pedestrian detection and tracking system includes multiple cameras that combine to encompass the scene around the powered industrial vehicle, each camera equipped with an independent image processor. The pedestrian detection system and methods detect pedestrians in a series of image frames obtained from each camera.

The principles and operation of a system and method for detecting, classifying and tracking in real time a pedestrian, in a series of images obtained from a series of cameras mounted on a powered industrial vehicle to provide a signal to warn the vehicle operator of the detected a pedestrian, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide a system and method for detecting a pedestrian, preferably in an angle 360° around the vehicle. The pedestrian detection and tracking system includes a multiple number of cameras, each with a wide angle lens, that combine to encompass the scene around the vehicle, up to a range of 15 meters and more. Each camera FOV is at least tangential to the FOV of the next neighboring camera and preferable has some overlap with the FOV of the next neighboring camera. In some embodiments of the present invention, the image processing system of each camera is capable of correcting fisheye distortion of the camera lens and then detecting a pedestrian if the pedestrian appears in one or more viewing zones of the system cameras, and track the detected pedestrian over time. Tracking is maintained even if the detected pedestrian sits bends down or lies down on the floor. Tracking is maintained when the image of a detected pedestrian departs from a frame provided by one camera and enters a frame of the next neighboring camera. Tracking of the detected pedestrian will then proceed using the second camera. Upon detection of a pedestrian by the system and/or when the range of the detected pedestrian to the powered industrial vehicle is below some threshold, the driver of the vehicle is notified.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Referring now to the drawings, FIG. 1 is a perspective view of an embodiment of a pedestrian detection and tracking system of the present invention configured with a powered industrial vehicle 10 (e.g. a forklift vehicle) and six camera units (50 and 60) viewing the scene in an angle 360° horizontally around the vehicle. The number of six cameras is given by way of example only, and the total number of cameras may vary depending on vehicle size, camera field of view, etc. Forklift 10 (with forks 40 being in the front of the vehicle) also includes an operator system interface that is typically located in dashboard 20 of vehicle 10, behind wheel 22.

Figure 2:
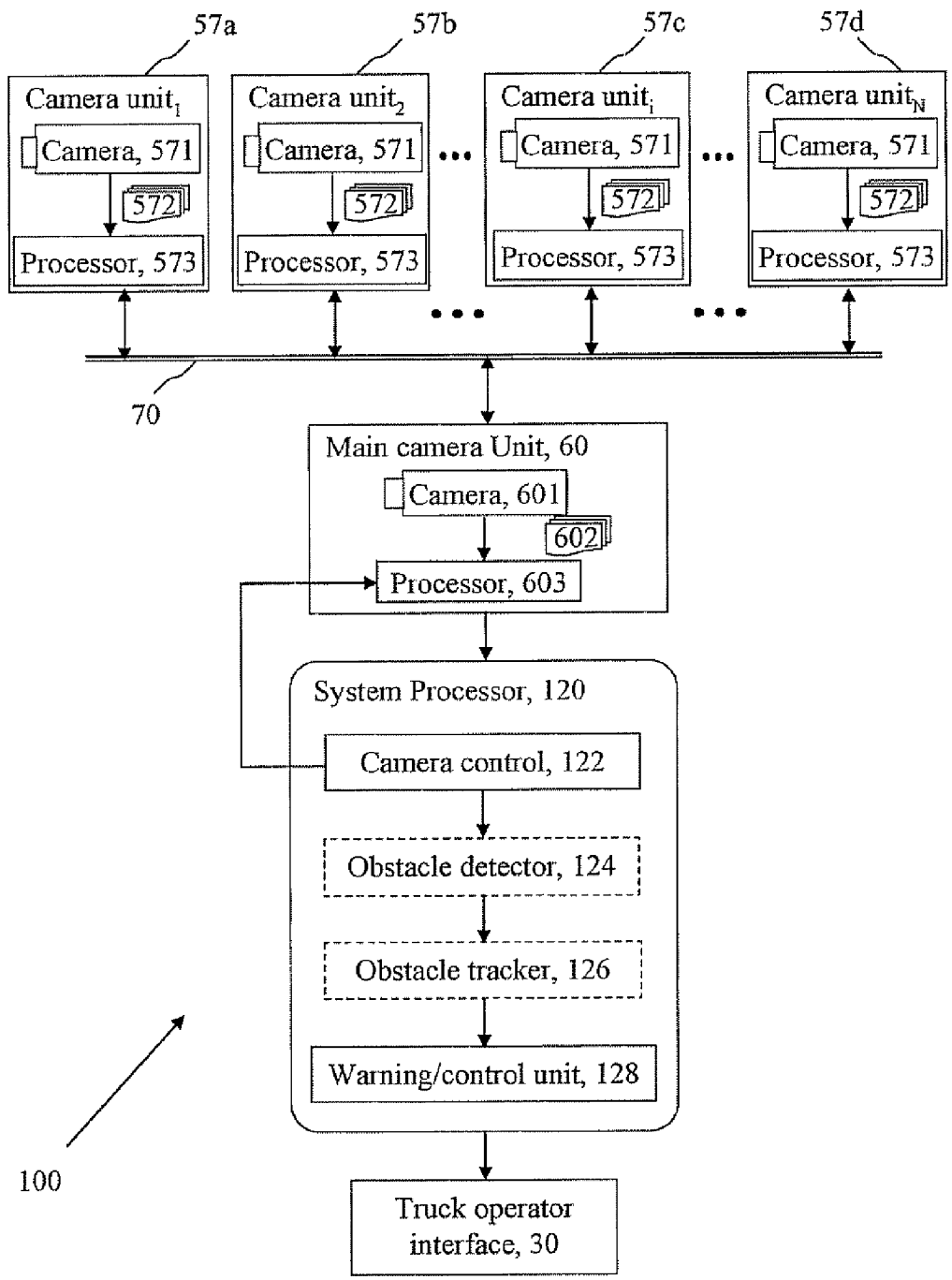
FIG. 2 is a schematic illustration of a system pedestrian detection with N cameras, according with embodiments of the present invention.

Referring now to FIG. 2, a schematic illustration of a pedestrian detection and tracking system 100 with N camera units (57 and 60), according to embodiments of the present invention, is shown. System 100 also includes a processor 120 and a vehicle operator interface 30. Each camera unit 57 includes an image sensor or camera 571, such as a CMOS sensor, and a processor 573. Image frames 572 are captured by camera 571. Methods according to different embodiments of the present invention analyze in real time image frames 572, using either processor 573 or processor 120 to detect one or more obstructions in image frames 572 and classify the detected obstructions as pedestrians. The detected pedestrian are then tracked over time, as long as a pedestrian is in the FOV of at least one camera. Processor 120 and processor 573 are a general purpose microprocessor, a processor implemented using digital signal processing (DSP) or an application specific integrated circuit (ASIC) or a combination of the different technologies.

It should be noted that a one time calibration procedure is performed when the cameras 50 and 60 are installed on vehicle 10. From a one time calibration procedure, the distance of each camera from the closest track external surface is measured and stored in the respective image processor and/or in the system processor. From a one time calibration procedure, the azimuth each camera optical axis relative to the longitudinal axis of the vehicle is measured and stored in the respective image processor and/or in the system processor.

All N camera units (57 and 60) can communicate with each other and with system processor 120, preferably over a common system data bus 70, e.g. CAN bus, USB bus, etc. In embodiments where digitized video signals are to be transferred to system processor 120 at a high frame rate, the selected bus should be of high bandwidth. Each camera unit 57 has an identification code (ID) and all messages a camera unit 57 transmits, includes the camera's ID. Optionally, each processor 573 of camera unit 57 is programmed to which camera ID to 'listen' to. For example, each camera unit 57 can be programmed to 'listen' only to the two adjacent cameras, in order to enable the performance of continuous tracking of a detected pedestrian.

System processor 120 includes a camera control unit 122 which coordinates the communication with each camera unit 57 and the inter communication among camera units 57. System processor 120 may also include a pedestrian detector 124 and an obstruction detector 126, which are used in a method in which detection and tracking of a pedestrian are not performed by the local image processor 573. System processor 120 may also includes a warning/control unit 128 which issues warnings to the vehicle operator and/or control the vehicle controls, e.g. the track braking system. System processor 120 is preferably connected directly to back pointing camera 60 or to front pointing camera 50. System processor 120 may also be integrated with one of the local image processor 573, preferably with back pointing camera 60 or front pointing camera 50.

Multiple Camera Configurations Examples

Figure 3:
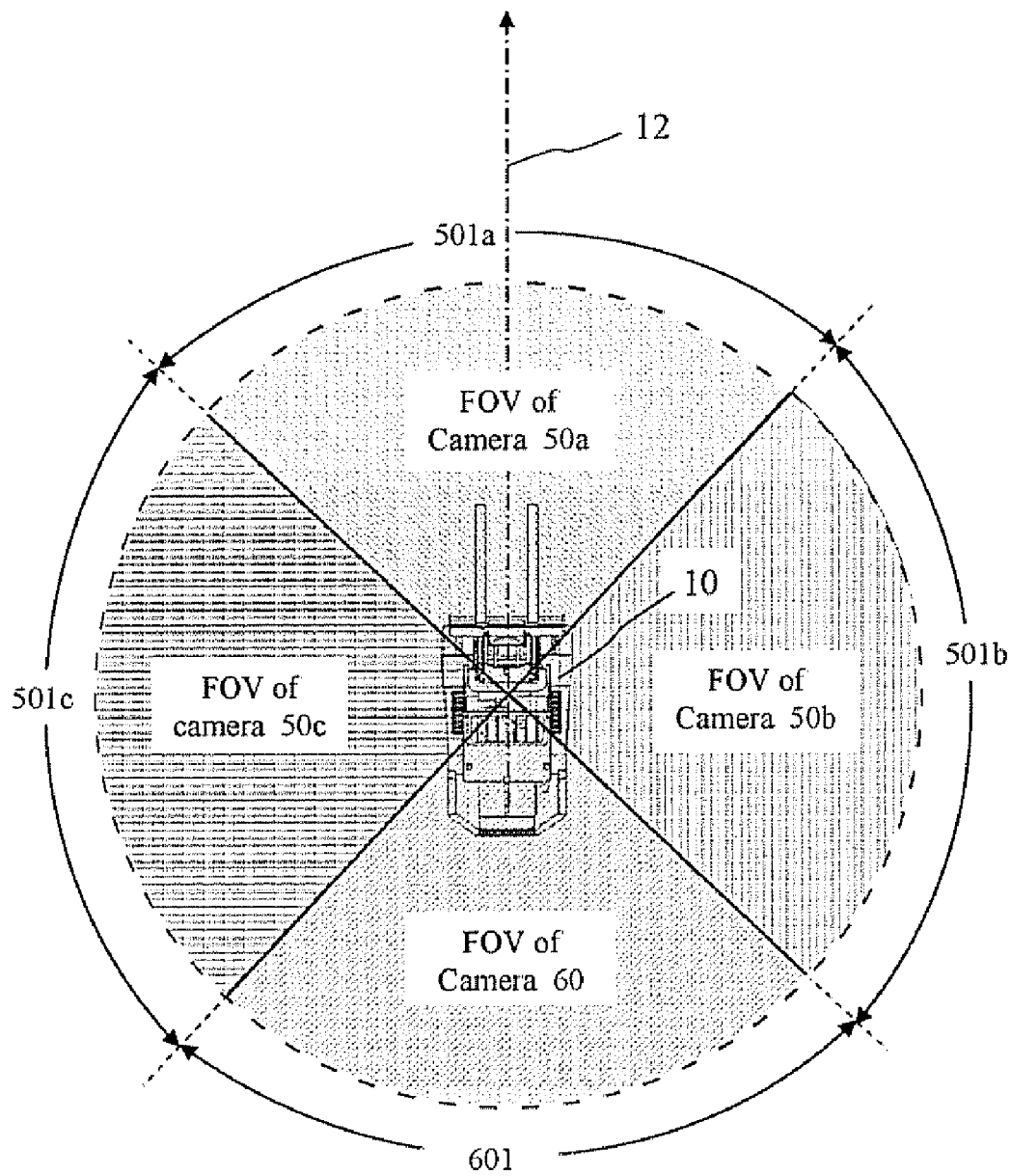
FIG. 3 is a top view of an embodiment of a pedestrian detection and tracking system of the present invention configured with a forklift vehicle and a four cameras system, illustrating the viewing zones in which each camera is viewing, each viewing zone is delineated by the 90° FOV of the respective camera.

Referring now to FIG. 3, a top view of an embodiment of a pedestrian detection and tracking system 100 of the present invention, configured with a forklift vehicle 10 and a four concentric cameras system, is shown. The viewing zones which each camera is viewing are delineated by the FOV of the respective camera: back pointing camera 60 has a FOV 601, front pointing camera 50a has a FOV 501a, right pointing camera 50b has a FOV 501b and left pointing camera 50c has a FOV 501c. In the embodiment illustrated in FIG. 3, FOVs 601 and 501 combine to encompass 360° horizontally around vehicle 10 with generally no overlap between adjacent FOVs. The preferred FOV of each camera 571, in a four camera configuration, is 90°, but the present invention is not limited to a 90° FOV, and any FOV angle can be used.

Figure 4:
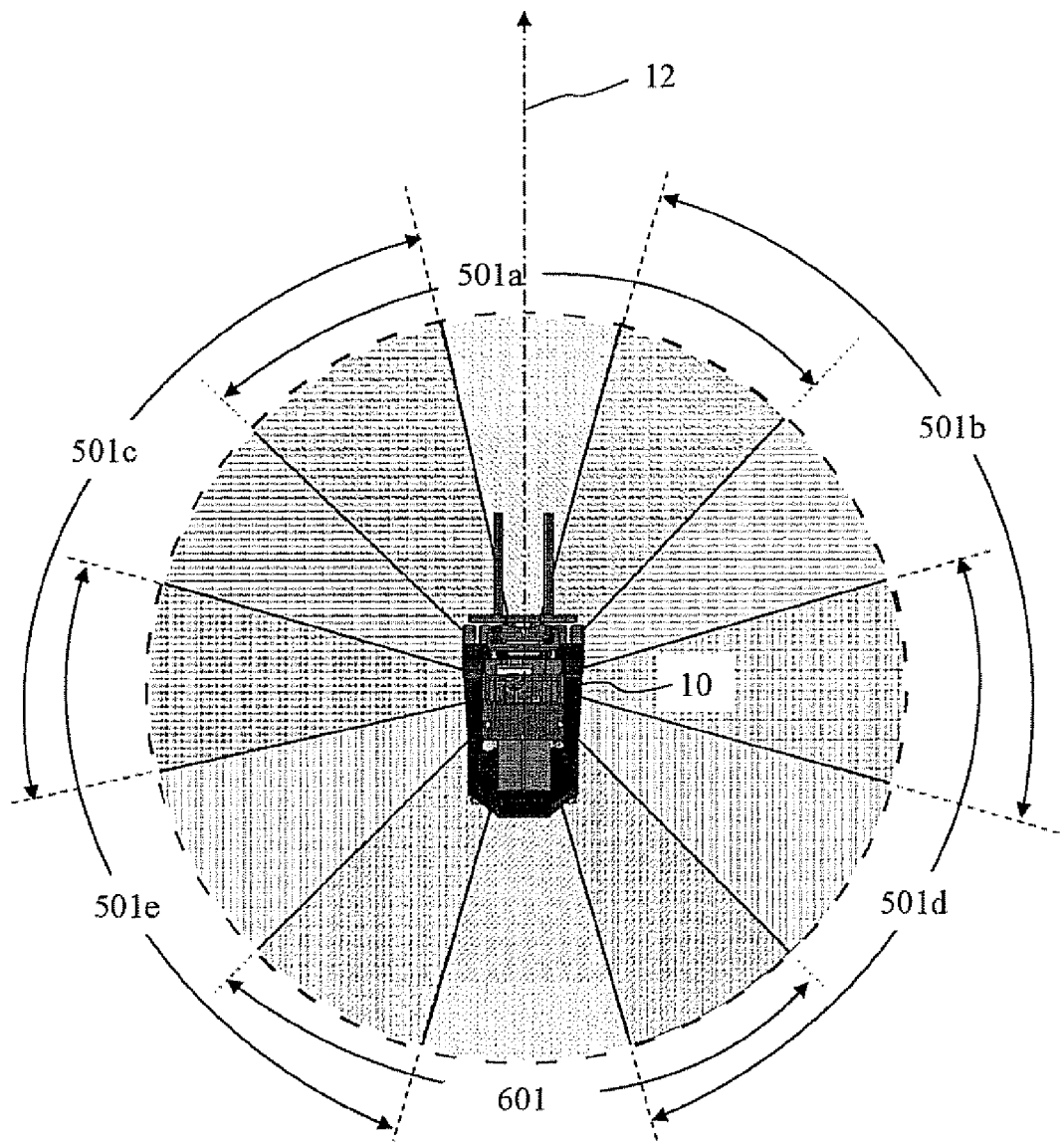
FIG. 4 is a top view of an embodiment of a pedestrian detection and tracking system of the present invention configured with a forklift vehicle and a six cameras system, illustrating the viewing zones in which each camera is viewing.

Referring now to FIG. 4, a top view of an embodiment of a pedestrian detection and tracking system 100 of the present invention configured with a forklift vehicle 10 and a six concentric cameras system, are shown. The viewing zones which each camera is viewing are delineated by the FOV of the respective camera: back pointing camera 60 has a FOV 601, front pointing camera 50a has a FOV 501a, right pointing cameras 50b and 50d has a FOV 501b and 501d and left pointing cameras 50c and 50c has a FOV 501e and 501e. In the embodiment illustrated in FIG. 4 FOVs 501 and 601 combine to encompass 360° horizontally around vehicle 10 with a 30° overlap between adjacent FOVs. The preferred FOV of each camera 571, in a four camera configuration, is 90°, but the present invention is not limited to a 90° FOV, and any FOV angle can be used.

Figure 5:
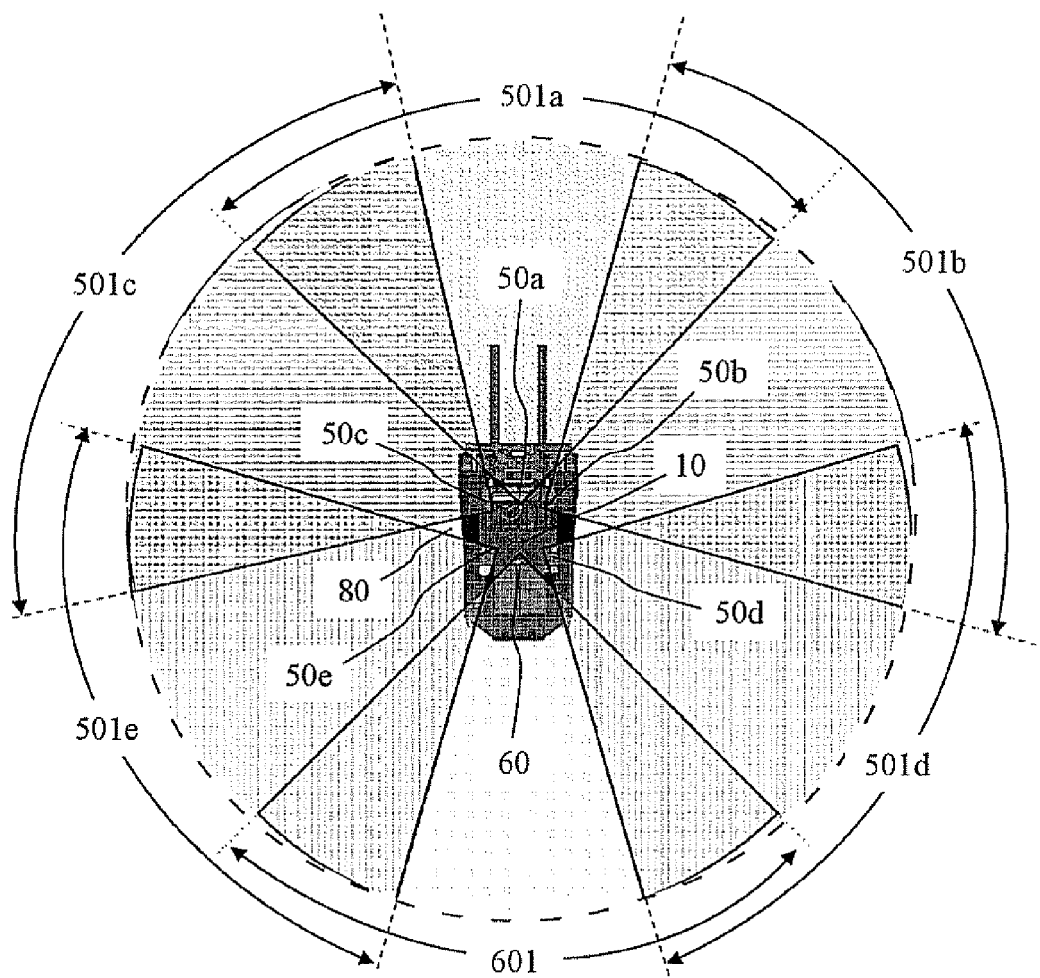
FIG. 5 is a top view of an embodiment of a pedestrian detection and tracking system of the present invention configured with a forklift vehicle and a six cameras system in a non-concentric configuration, illustrating the viewing zones viewed by each camera.

Placing N cameras in a concentric configuration is often not practical on a powered industrial vehicle, which typically has only partial housing and partial roofing. The cameras need to be placed at location such that no or minimal blocking of field of vision of a camera occur. Each camera is preferably housed in a permanent structure and placed in a protective location due to the working conditions of and around the powered industrial vehicle. Hence, the cameras are typically placed in a non-concentric configuration. FIG. 5 is a top view of an embodiment of a pedestrian detection and tracking system 100 of the present invention configured with a forklift vehicle 10 and a six cameras system in a non-concentric configuration. The viewing zones which each camera is viewing are delineated by the FOV of the respective camera: back pointing camera 60 has a FOV 601, front pointing camera 50a has a FOV 501a, right pointing cameras 50b and 50d has a FOV 501b and 501d and left pointing cameras 50c and 50c has a FOV 501e and 501e. Each adjacent pair of viewing zones overlap is reduced to about 2°. Some blind spots 80 maybe formed. Blind spots 80 are limited in range to a few feet. In the example shown in FIG. 5 of a pedestrian detection and tracking system 100 with a four camera configuration, the FOV of each camera 571, is 90°, but the present invention is not limited to a 90° FOV, and any FOV angle can be used.

Figure 6:
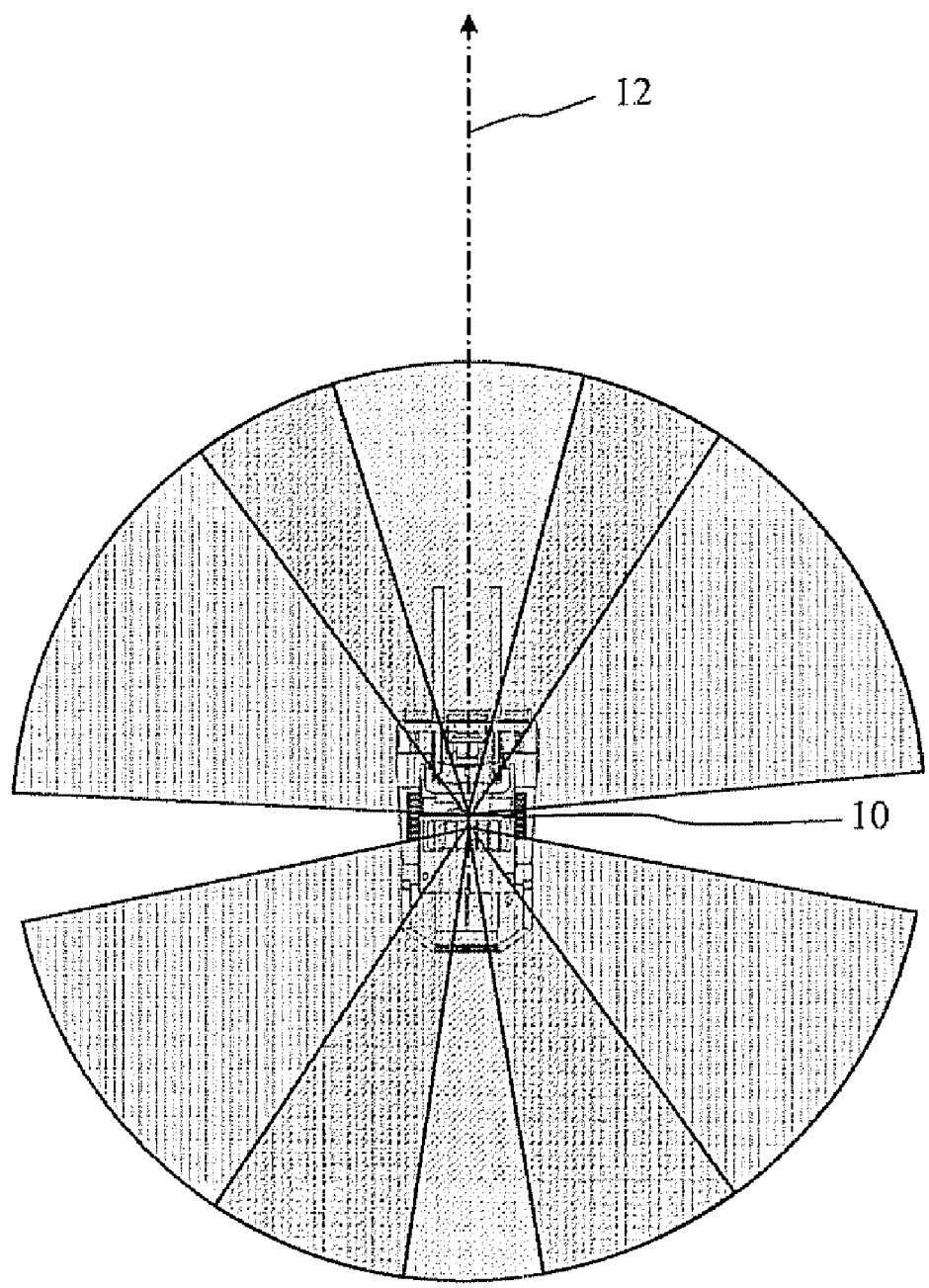
FIG. 6 is a top view of an embodiment of a pedestrian detection and tracking system of the present invention configured with a forklift vehicle and a six cameras system, illustrating the viewing zones in which each camera is viewing, the six cameras encompassing two separate zones.

The present invention preferably encompasses 360° horizontally around vehicle 10 with an overlap between adjacent FOVs. But in some embodiments of the present invention, pedestrian detection and tracking system 100 may encompass and area horizontal angle less than 360°. FIG. 6 is a top view of an embodiment of a pedestrian detection and tracking system 100 of the present invention configured with a forklift vehicle 10 and a six cameras system, illustrating the viewing zones in which each camera is viewing, the six cameras encompassing two separate zones. This configuration is given by way of example only and other configurations encompass and area horizontal angle less than 360° are possible and are within the scope of the present invention.

Vehicle Operator Interface

Figure 9:
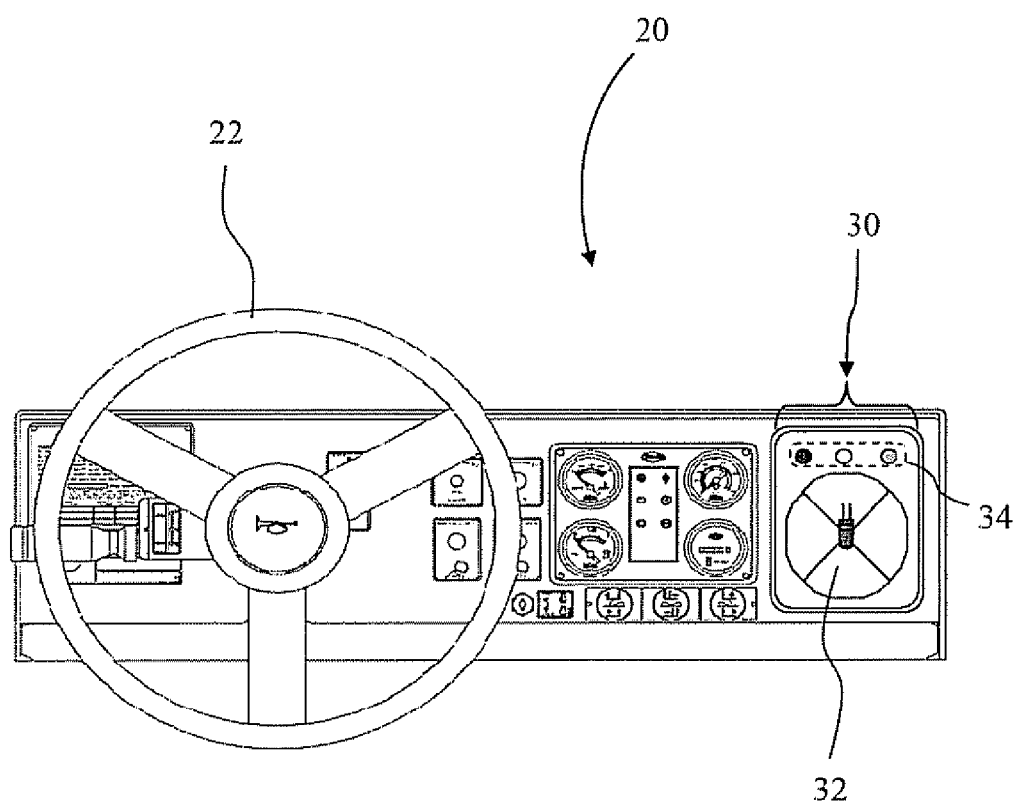
FIG. 9 is a conceptual view of the operator interface/control according with embodiments of the present invention.

Pedestrian detection and tracking system 100 also includes a vehicle operator interface unit 30, which is typically located in dashboard 20 of vehicle 10, behind wheel 22. FIG. 9 is an example illustration of a vehicle operator interface/control 30 according to embodiments of the present invention. Interface 30 may include visual and/or audible indication to alert the operator on the presence of a pedestrian in the vicinity of vehicle 10. In the example of FIG. 9, interface 30 includes a display 32 presenting the cameras viewing zones, and light indicators 34, for example green red and amber, indicating the danger level to a detected pedestrian in vehicle 10 vicinity. When a pedestrian is detected, the corresponding zone of display 32, representing the zone around vehicle 10 in which the pedestrian is located, may, for example, turn on, change color or provide any other type of indication.

Methods of the Present Invention

Figure 10:
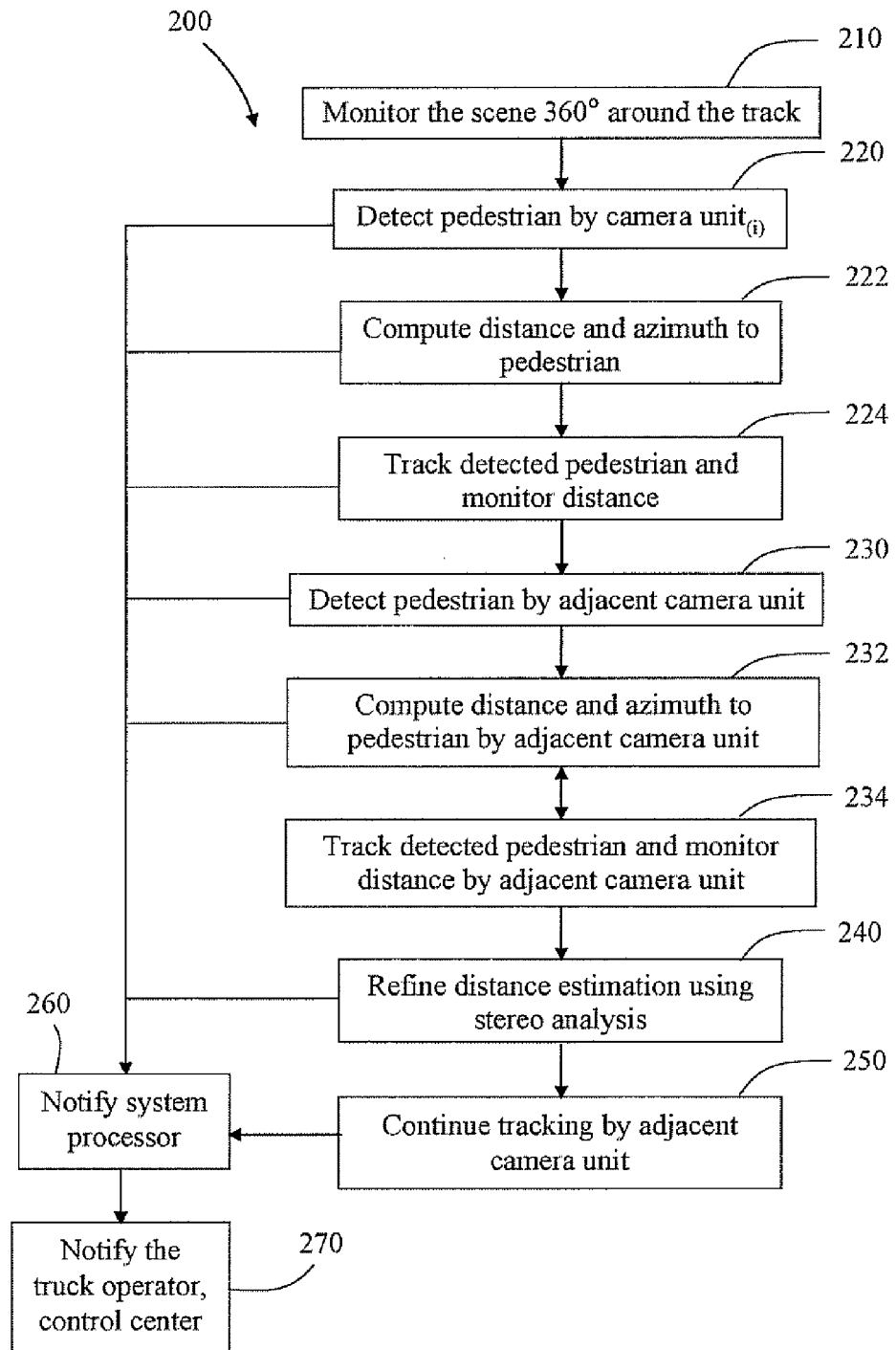
FIG. 10 is a schematic flow diagram of a method 200 for detecting a pedestrian, in a pedestrian detection and tracking system mounted on a powered industrial vehicle, according with embodiments of the present invention.

Referring back to FIG. 2 and also referring now to FIG. 10, which is a schematic flow diagram of a method for detecting a pedestrian, in a pedestrian detection and tracking system 100 mounted on a powered industrial vehicle 10, according with embodiments of the present invention. In method 200, when vehicle 10 is operated, pedestrian detection and tracking system 100 starts monitoring the scene in an angle 360° horizontally around vehicle 10 (step 210) with N camera units (57 and 60). Upon the entering of a pedestrian into a zone viewed by an image sensor 571 of camera unit 57, the image frames 572, which include the images of the pedestrian, are transmitted to respective image processor 573. Image processor 573 analyzes image frames 572 and detects the pedestrian (step 220), thereby producing a detected pedestrian. The distance and azimuth from vehicle 10 to the pedestrian are computed (step 222) and system processor 120 is notified (step 260). System processor 120 in turn notifies the vehicle operator and possibly other bodies, such as a control center (step 270). Image processor 573 tracks the detected pedestrian (step 224), using camera unit 57, while continuing computing the distance and azimuth from vehicle 10 to the detected pedestrian. The two adjacent camera units 57 are notified by system processor 120 about the detected pedestrian being detected tracked by camera unit 57.

Upon the entering of the pedestrian also into a zone viewed by the image sensor of a camera unit adjacent to camera unit of camera unit 57, image processor 573 of the adjacent camera unit 57 analyzes respective image frames 572 received from image processor 573 of the adjacent camera unit 57. Image processor 573 of the adjacent camera unit 57 detects the pedestrian (step 230), thereby also producing a detected pedestrian data object. The distance and azimuth from vehicle 10 to the pedestrian are computed (step 232) and system processor 120 is notified (step 260). Image processor 573 of the adjacent camera unit 57 starts tracking the detected pedestrian (step 234), using the adjacent camera unit 57, while continuing computing the distance and azimuth from vehicle 10 to the detected pedestrian. When there is an overlap of the zone viewed by the image sensor of a camera unit 57 and the zone viewed by the image sensor of the adjacent camera unit 57, stereo analysis is performed by system processor 120 to refine the distance estimation to the twice detected pedestrian (step 240). The results of the stereo analysis are synchronized by system processor 120 with the image processors 573 of the two camera units 57. When the pedestrian drops out of the zone viewed by one of the image sensors 571, tracking proceeds using the other camera unit 57 (step 260). As tracking continuous and the distance and/or azimuth to the detected pedestrian are changing, system processor 120 is notified and in turn, the vehicle operator is updated (step 270). In the following description, method steps of method 200 are discussed in further detail.

Step 210: Monitor the scene in an angle 360° horizontally around the vehicle.

A power industrial vehicle 10 is typically a vehicle that can travel in any direction and rapidly change the direction of travel. But the operator of vehicle 10 stays in the same orientation, relative to vehicle 10, not being able to continuously view all the area around vehicle 10, a set of cameras are positioned on vehicle 10 to continuously monitor the scene in an angle 360° horizontally around vehicle 10, up to a range of 15 meters and more, using N camera units (57 and 60). In a preferred embodiment, six camera units are used (N=6). Camera units (57 and 60) are positioned in a protected location in the periphery of vehicle 10. Viewing zones of adjacent cameras 50 preferably overlap in horizontal angle and at least tangential. In a non-concentric six camera configuration, each camera 50 preferably has a 90° FOV and the viewing zones overlap of about 20° in horizontal angle.

Step 220: Detect pedestrian by camera unit 57.

Upon the entering of a pedestrian into a viewing zone viewed by an image sensor 571 of camera unit 57, image frames 572 including the pedestrian image are transmitted to respective image processor 573. Image processor 573 analyzes image frames 572 and detects the pedestrian, thereby producing a detected pedestrian data object. Detection is made at a distance ranging from 1.5 meters and up to 15 meters and more. At a distance below 1.0 meter, not the whole body of a pedestrian is in the viewing zone of a camera.

Step 222: Compute distance and azimuth to pedestrian.

Figure 7:
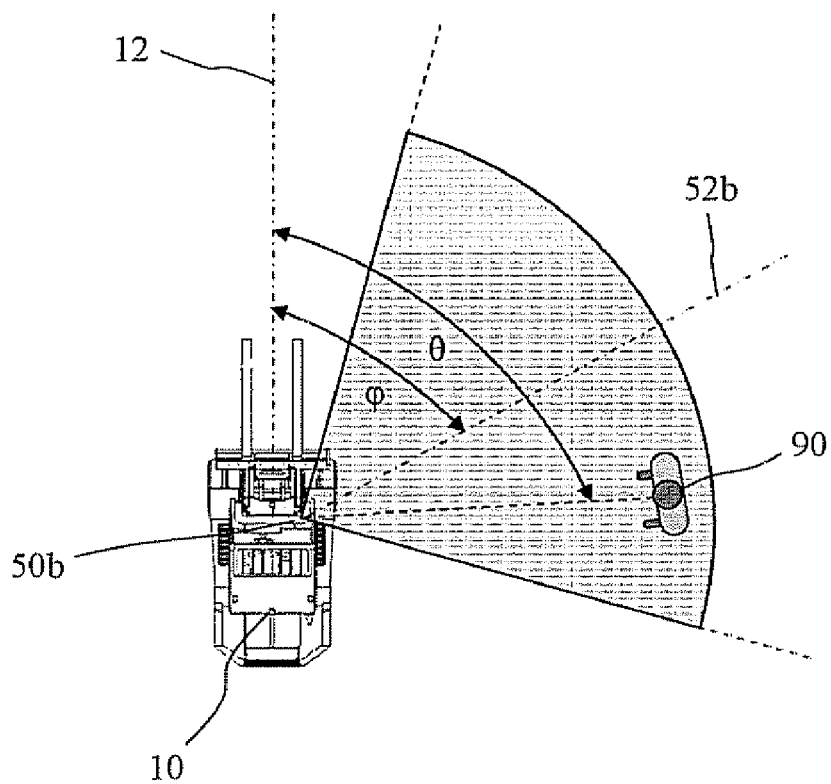
FIG. 7 is a top view of a pedestrian detection and tracking system of the present invention illustrating a example of a viewing zone viewed by a camera 50$b$, having a pedestrian 90 in the viewing zone.
Figure 8:
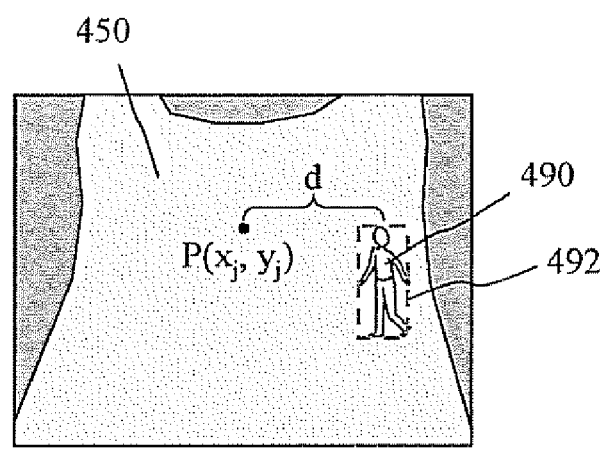
FIG. 8 is a view of an image on an image plan of the camera 50$b$, as illustrated in FIG. 7.

Image processor 573 computes the distance from vehicle 10 to the detected pedestrian. U.S. '048 provides methods for computing and refining distance measurements from a vehicle hosting the distance measuring system, to an obstruction, including pedestrians. FIG. 7 is a top view of a pedestrian detection and tracking system 100 of the present invention illustrating an example of a viewing zone viewed by the image sensor of camera unit 50, having a pedestrian 90 in the viewing zone. FIG. 8 is a view of a corrected image 450 on an image plan of image sensor of camera unit 50, as illustrated in FIG. 8. Image 450 includes a detected pedestrian 490 with a rectangle 492 enclosing detected pedestrian 490. Each image processor 573 knows the distance of respective image sensor of camera unit 50 from the local external surface of vehicle 10 and computes the distance to the bottom of rectangle 492. Distance measurement is performed as described in U.S. '048. Image processor 573 also knows the azimuth φ of the optical axis of image sensor of camera unit 50 and the pixel $P(x_j, y_j)$ which represents the optical axis in image 450. The azimuth θ to pedestrian 90 is computed from the displacement d in the image of detected pedestrian 490 relative to $P(x_j, y_j)$ and from the known angle φ between the optical axis 52*b* of the image sensor of camera unit 50 and the longitudinal axis 12 of vehicle 10.

Step 224: Track detected pedestrian 490 and monitor distance.

Pedestrian tracking is performed as described in U.S. '867. Image processor 573 continuously tracks detected pedestrian 490 in image 450 as the image of detected pedestrian 490 changes the position inside image 450, as both pedestrian 90 and vehicle 10 are changing the spatial positions. As pedestrian 90 and vehicle 10 are changing spatial positions, image processor 573 continuously re-computes the distance from vehicle 10 to pedestrian 90 and the azimuth to pedestrian 90 relative to vehicle 10. Although detection is not ensured when the distance of a pedestrian 90 form vehicle 10 is below 1.5 meters, but tracking is maintained down to a distance of at least 1 meter.

Tracking is maintained even if pedestrian 90 sits down, bends down or lies down on the floor. Tracking is also maintained when the image of a detected pedestrian 490 departs from an image frame 572 provided by an image sensor 571 and enters the image frame 572 of the next neighboring camera 571. Tracking of the detected pedestrian 490 will then proceed using the second image sensor 571.

Step 230: Detect pedestrian by a neighbor camera unit.

When a pedestrian 90 enters a zone viewed by a second adjacent image sensor, image processor 573 of the adjacent camera unit 57 analyzes respective image frames 572 and detects pedestrian 490 as was done by image processor 573 in step 220.

Step 232: Compute distance and azimuth to pedestrian by the neighbor camera unit.

Image processor 573 of neighbor camera unit 57 computes the distance and azimuth to pedestrian 90 as was done by image processor 573 in step 222.

Step 234: Track detected pedestrian 490 and monitor distance by the neighbor camera unit.

Image processor 573 of neighbor camera unit 57 continuously tracks and re-computes the distance and azimuth to pedestrian 90 as was done by image processor 573 in step 224.

Step 240: Refine distance estimation using stereo analysis.

When a pedestrian 90 enters a zone viewed by two adjacent image sensors 571, image processor 573 employs stereo analysis to refine the measured distance from the external surface of vehicle 10 to pedestrian 90. The stereo analysis to refine the distance estimation to the twice detected pedestrian (step 240), is performed by system processor 120. The results of the stereo analysis are synchronized by system processor 120 and image processors 573 performing the detection and tracking.

Step 250: Continue tracking by the neighboring camera unit.

When a pedestrian 90 departs the zone viewed image sensor 571 and remains only in the zone viewed by adjacent image sensor 571, only the respective image processor 573 continuous to track and to re-computes the distance and azimuth to pedestrian 90.

Step 260: Notify system processor.

When an image processor 573 detects an obstruction and classifies the obstruction as a pedestrian 90, image processor 573 notifies on the detected pedestrian 490 to system processor 120. The notification message also includes an identification code, to enable system processor 120 to identify the sending camera unit 57. System processor 120 prepares the two adjacent camera units 57 for the possibility that pedestrian 90 will enter the camera units 57 viewing zones. System processor 120 is updated when tracking of a detected pedestrian 490 is established or stopped. System processor 120 is also continuously updated as to the distance and azimuth from the external surface of vehicle 10 to pedestrian 90.

Step 270: Notify the vehicle operator, control center.

When an image processor 573 detects pedestrian 90 and notifies system processor 120, system processor 120 notifies the vehicle operator by activating the proper indicators in operator interface 30, the indicators being visual and/or audible. The notification to the vehicle operator may be performed according to a pre-designed warning schemer, e.g., the audible alarm to the operator is either constant in tone and loudness, or with a progressive increase in loudness and frequency as the pedestrian's 90 proximity to vehicle 10 decreases. The visual warning scheme can include, for example, indicating lights that turn from green to amber and from amber to red, as the pedestrian's 90 proximity to vehicle 10 decreases. The audio warning can be stereophonic, or surround or directional in any other way, such that it indicates the relative position of the detected pedestrian.

It should be noted that system processor 120 may not only notify the vehicle operator but also operate controls of vehicle 10, e.g. activate vehicle 10 brakes and/or reduce engine power, to avoid an accident.

Figure 11:
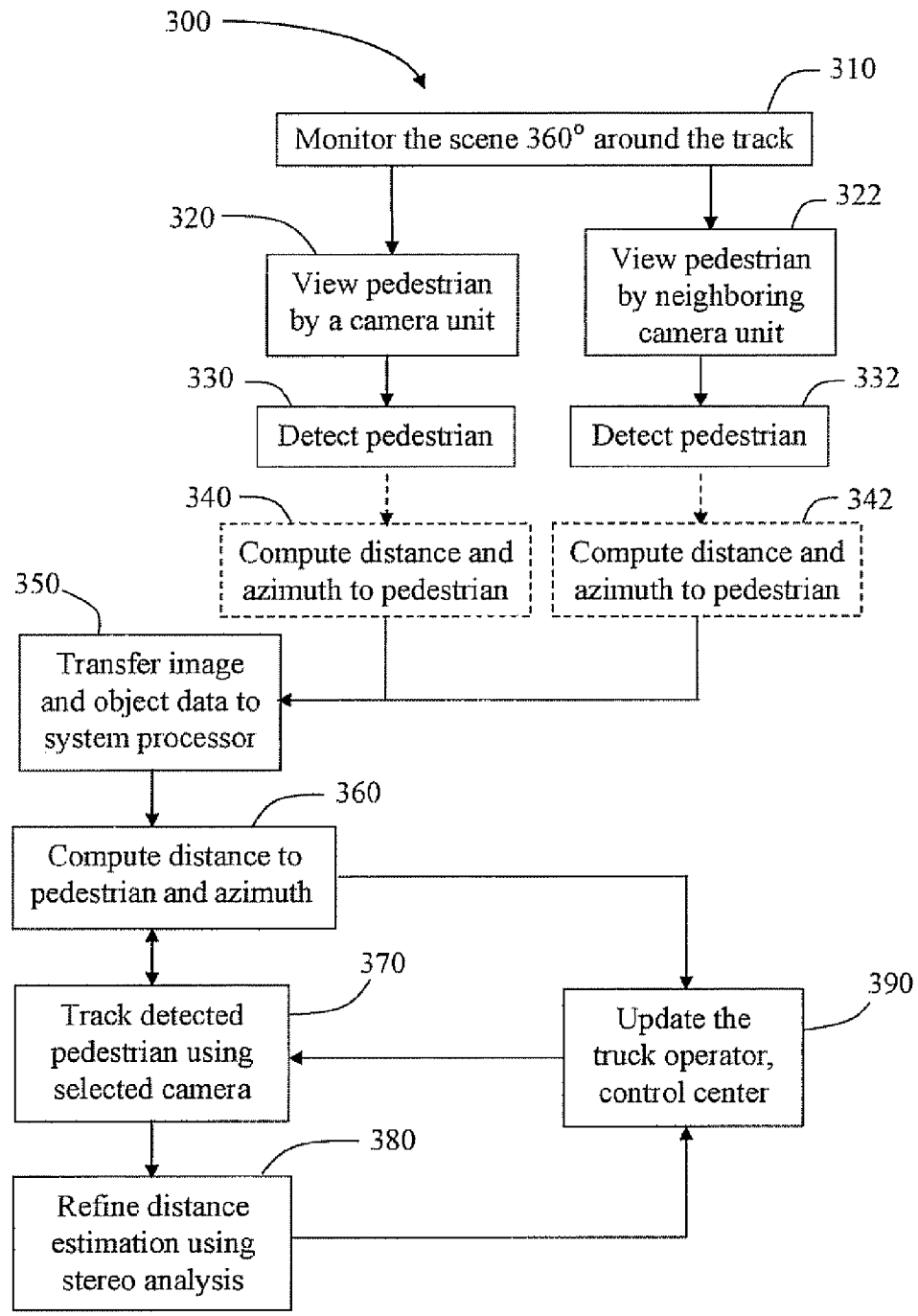
FIG. 11 is a schematic flow diagram of a method 300 for detecting a pedestrian, in a pedestrian detection and tracking system mounted on a powered industrial vehicle, according with embodiments of the present invention.

Reference is also now made to FIG. 11, which is a schematic flow diagram of a method for detecting a pedestrian 90, in a pedestrian detection and tracking system 100 mounted on a powered industrial vehicle 10, according with other embodiments of the present invention. It should be noted that in order for method 300 to perform in real time, bus 70 (see FIG. 2) must accommodate the required transferred rate of video images from processors 573 to system processor 120.

In method 300, when vehicle 10 is operated, pedestrian detection and tracking system 100 starts monitoring the scene in an angle 360° horizontally around vehicle 10 (step 310). Upon entering of a pedestrian 90 into a zone viewed by an image sensor 571 of camera unit 57 (step 320), respective image processor 573 analyzes respective image frames 572 and detects the pedestrian 490 (step 330), thereby producing a detected pedestrian data object. Optionally, image processor 573 also computes the distance and azimuth from vehicle 10 to detected pedestrian 490 (step 340).

The detected pedestrian data object, which may include the images including detected pedestrian 490, computed distance and azimuth aid camera unit 57 ID, are transmitted by image processor 573 to system processor 120 (step 350). The distance and azimuth from vehicle 10 to pedestrian 90 are computed (step 360, if not computed in step 340). The vehicle operator and/or other bodies, such as a control center, are then notified (step 390). System processor 120 starts tracking the detected pedestrian 490 (step 370), using camera unit 57, while continuing computing the distance and azimuth from vehicle 10 to pedestrian 90 (step 360). Any change in distance or azimuth is reported (step 390).

The two adjacent camera units 57 are notified by system processor 120 that detected pedestrian 490 is being tracked, using camera unit 57. Upon entering of pedestrian 90 into a zone viewed by a neighboring camera unit of camera unit 57 (step 322), respective image processor 573 analyzes respective image frames 572 and detects the pedestrian 490 (step 332), thereby producing a detected pedestrian data object. Optionally, image processor 573 also computes the distance and azimuth from vehicle 10 to detected pedestrian 490 (step 342). The detected pedestrian data object is transmitted by image processor 573 to system processor 120 (step 350).

System processor 120 performs stereo analysis to refine the distance estimation to the detected pedestrian 490 (step 380). When pedestrian 90 drops out of the zone viewed by image sensor 571, tracking proceeds using the adjacent camera unit 573 (step 370), which pedestrian 90 is in the respective image sensor 572 viewing zone. As tracking continuous and the distance and/or azimuth to pedestrian 90 are changing, the vehicle operator is updated (step 390).

Figure 12:
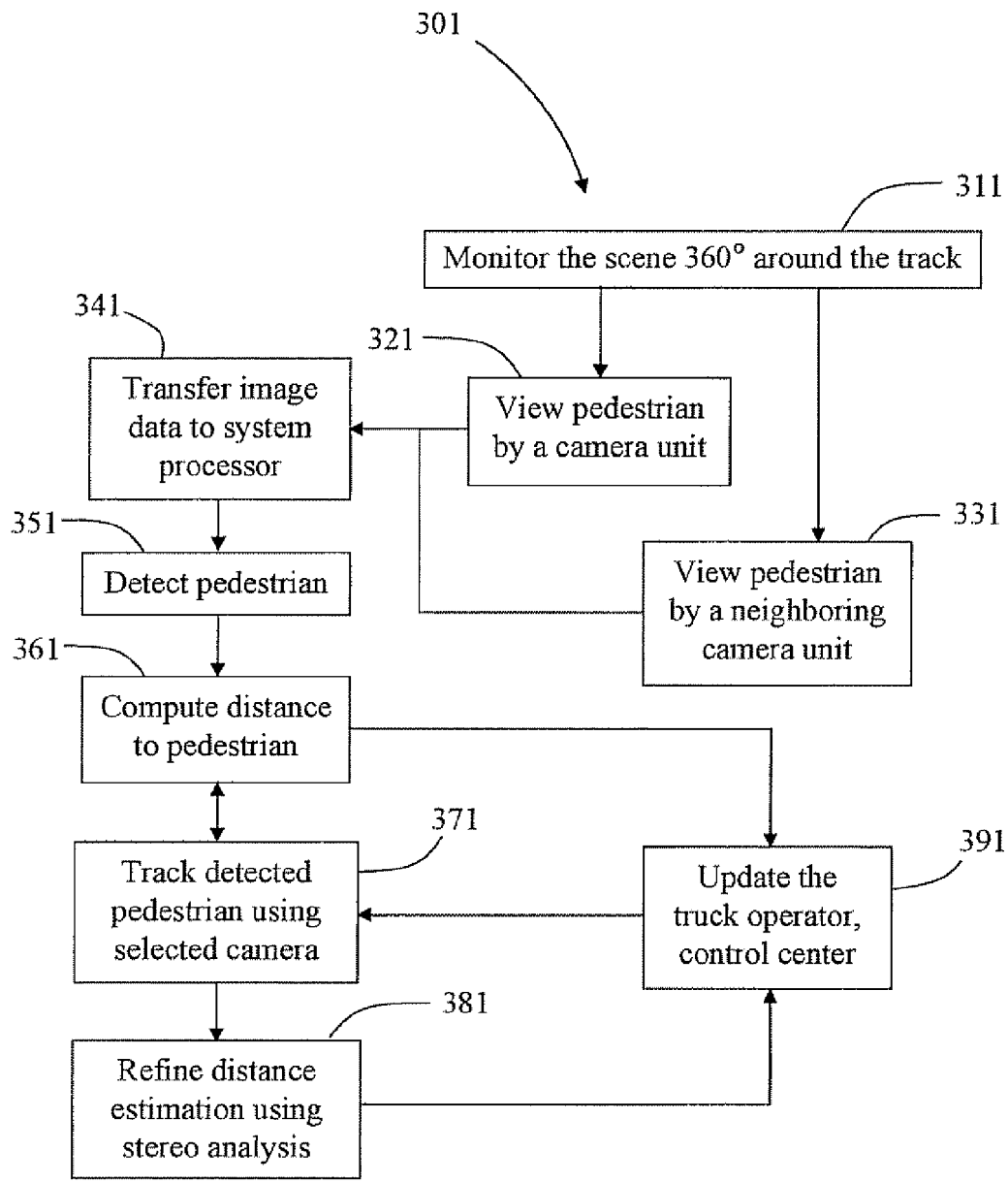
FIG. 12 is a schematic flow diagram of a method 301 for detecting a pedestrian, in a pedestrian detection and tracking system mounted on a powered industrial vehicle, according with embodiments of the present invention.

Reference is also now made to FIG. 12, which is a schematic flow diagram of a method for detecting a pedestrian 90, in a pedestrian detection and tracking system 100 mounted on a powered industrial vehicle 10, according with other embodiments of the present invention. It should be noted that in order for method 301 to perform in real time, bus 70 (see FIG. 2) must accommodate the required transferred rate of video images from processors 573 to system processor 120.

In method 301, when vehicle 10 is operated, pedestrian detection and tracking system 100 starts monitoring the scene in an angle 360° horizontally around vehicle 10 (step 311). Upon entering of a pedestrian 90 into a zone viewed by an image sensor 571 of camera unit 57 (step 321), the image frames 572, which include the images of pedestrian 90, are transmitted by respective processor 573 to system processor 120 (step 341). System processor 120 analyzes image frames 572 and detects the pedestrian (step 351), thereby producing a detected pedestrian. The distance and azimuth from vehicle 10 to pedestrian 90 are computed (step 361) and the vehicle operator and/or other bodies, such as a control center, are notified (step 391). System processor 120 starts tracking the detected pedestrian 490 (step 371), using camera unit 57, while continuing computing the distance and azimuth from vehicle 10 to pedestrian 90. Any change in distance or azimuth is reported (step 391). The two adjacent camera units 57 are notified by system processor 120 that detected pedestrian 490 is being tracked, using camera unit 57. Upon entering of pedestrian 90 into a zone viewed by a neighboring camera unit of camera unit 57, stereo analysis is used to refine the distance estimation to the detected pedestrian 490 (step 381). When pedestrian 90 drops out of the zone viewed by image sensor 571, tracking proceeds using the adjacent camera unit 573 (step 371) which pedestrian 90 is in the respective image sensor 572 viewing zone. As tracking continuous and the distance and/or azimuth to pedestrian 90 are changing, the vehicle operator is updated (step 391).

Distortion Correction

In order to be able to continuously monitor the scene in an angle 360° horizontally around vehicle 10, pedestrian detection and tracking system 100 of the present invention utilizes N camera unit 57, where in the preferred embodiment, N=6 Still, to maintain some overlap between viewing zones formed by the FOV of each adjacent pair of cameras, a 90° FOV is needed. A 90° FOV implies using wide-angle lenses which deform the images obtained by the camera by a large extend of distortion.

Figure 13A:
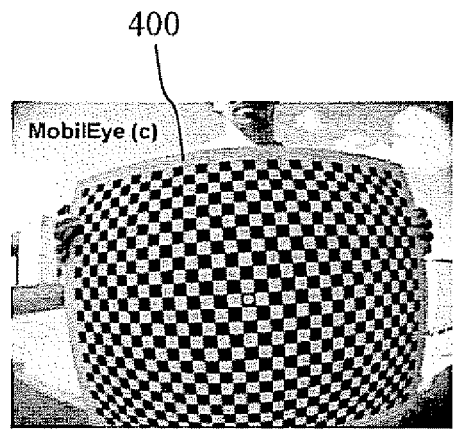
FIG. 13a illustrates a distorted image of a checkerboard pattern, as imaged through a 90° fisheye lens, used by a camera according to embodiments of the present invention.
Figure 13B:
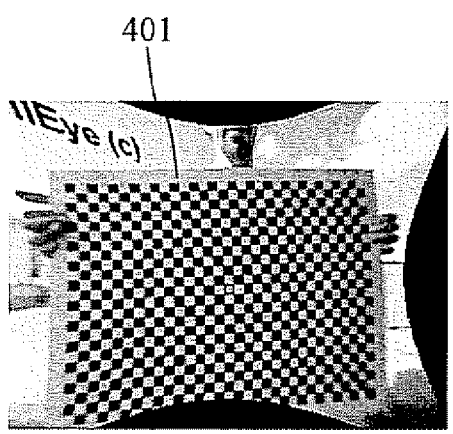
FIG. 13b illustrates the corrected image of the checkerboard pattern image of FIG. 13a, as corrected by a system of the present invention.

Reference is now made to FIGS. 13a and 13b. FIG. 13a illustrates a distorted image 400 of a checkerboard pattern, as imaged through a 90° fisheye lens, used by a camera 571 according to embodiments of the present invention. FIG. 13b illustrates the corrected image 401 of the checkerboard pattern of FIG. 13a. The corrected image 401 of the checkerboard pattern demonstrates the extent of the distortion of the distorted image 400 of a checkerboard pattern. The corrected image 401 of the checkerboard pattern demonstrates the ability of pedestrian detection and tracking system 100 to correct the distortion.

Figure 14A:
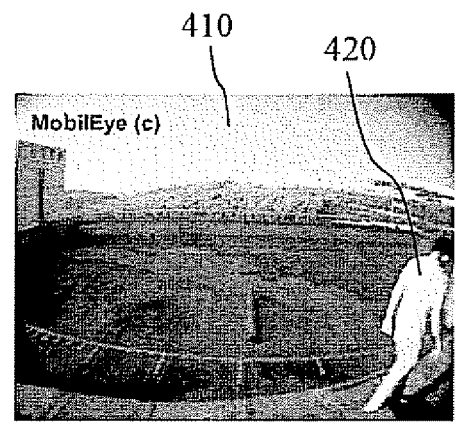
FIG. 14a illustrates a distorted image of a scene, as imaged through a 90° fisheye lens, used by a camera according to embodiments of the present invention.
Figure 14B:
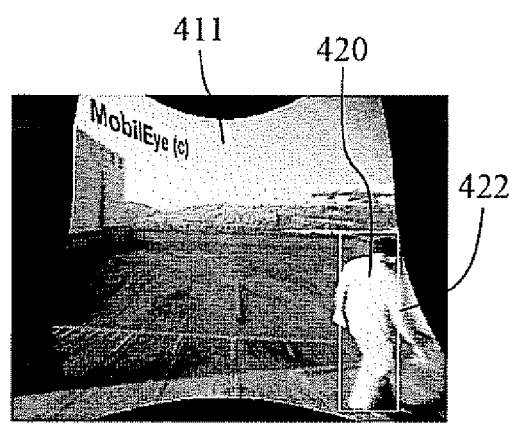
FIG. 14b illustrates the corrected image of the scene image of FIG. 14a, as corrected by a system of the present invention.

Reference is also now made to FIGS. 14a and 14b. FIG. 14a illustrates a distorted image 410 of a scene, as imaged through a 90° fisheye lens, used by a camera according to embodiments of the present invention. FIG. 14b illustrates the corrected image 411 of the scene image of FIG. 14a. Pedestrian 420 is tracked in the corrected image 411, as illustrated by rectangle 422. It should be noted the optical distortion is fixed per each individual system and needs to be measured only once in a system lifetime to derive its optical correction equation.

In embodiments of the present invention, pedestrian detection and tracking system 100 is mounted and operated on powered military vehicles.

In embodiments of the present invention, pedestrian detection and tracking system 100 is fused with a SONAR obstruction detection system, whereby the confidence of pedestrian detection is enhanced. The SONAR obstruction detection system comprises one or more ultrasonic transmitters and one or more sensors, whereas the fusion of information obtained from pedestrian detection and tracking system 100 and the SONAR obstruction detection system, is performed by either one or more processors 573 or by system processor 120.

In embodiments of the present invention, pedestrian detection and tracking system 100 is fused with a FIR (Far Infra-Red) obstruction detection system, whereby the confidence of pedestrian detection is enhanced. The FIR obstruction detection system comprises one or more FIR image sensors, whereas the fusion of information obtained from pedestrian detection and tracking system 100 and the FIR obstruction detection system, is performed by either one or more processors 573 or by system processor 120.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A system mounted on a powered industrial vehicle for detecting and classifying in real time at least one obstruction in the scene around the vehicle, the vehicle capable of moving in multiple directions, the system comprising:
   (a) a plurality of cameras mounted on the vehicle; and
   (b) a plurality of image processors operatively attached to each of said cameras, wherein said image processors each processes a plurality of image frames acquired respectively by said cameras, and when a pedestrian is present in the viewing zone viewed by one of said cameras, the image processor attached to said one camera identifies in at least one of the image frames at least a portion of an image of the detected pedestrian, thereby producing a detected pedestrian data object, and wherein said detected pedestrian data object is transferred from said one camera to another one of the cameras, thereby tracking the pedestrian.

2. The system of claim 1, wherein the viewing zones viewed respectively by said cameras encompass 360° horizontally around the vehicle.

3. The system of claim 1, wherein said tracking is performed horizontally over 360°.

4. The system of claim 1, wherein said image processor attached to said one camera identified said detected pedestrian, further processes said at least one of the image frames to track said detected pedestrian.

5. The system of claim 1, further comprising:
   (c) a system processor which controls said plurality of cameras and notifies the vehicle operator on each detected pedestrian.

6. The system of claim 5, wherein said system processor further processes said at least one of the image frames to track said detected pedestrian identified by said image processor.

7. The system of claim 5, wherein said system processor and said image processor share a common bus, wherein said transfer of said detected pedestrian data object from said one camera to another one of the cameras is performed over said bus and wherein said transfer of said detected pedestrian data object is also transferred to said system processor.

8. The system of claim 1, wherein said data object comprises features selected from the group of features including distance, azimuth angle, size, time, color.

9. The system of claim 5, further comprising:
   (d) a vehicle operator interface for receiving signals from said system processor.

10. The system of claim 9, wherein said vehicle operator interface comprises indicators selected from the group of indicators including lights, colored lights, display, speakers.

11. The system of claim 10, wherein said speakers are configured in a stereophonic configuration or in a surround configuration.

12. The system of claim 11, wherein the stereo sound produced from said configuration is indicating to the vehicle operator the direction to said detected pedestrian.

13. The system of claim 5, further comprising:
   (e) an activation mechanism operatively attached to said system processor, said activation mechanism causing vehicle to slow down or stop, to avoid an accident.

14. The system of claim 1, wherein said viewing zones as viewed by adjacent pairs of said cameras angularly overlap horizontally.

15. The system of claim 5, wherein said system processor and one of said image processors are operated from a single processor.

16. In a system mounted on a powered industrial vehicle for detecting and classifying in real time at least one obstruction in the scene around the vehicle, the vehicle capable of moving in multiple directions, a method comprising the steps of:
   (a) providing plurality of cameras mounted on the vehicle; and
   (b) processing said at least one image by image processors operatively attached to each of said cameras, wherein said image processors each processes a plurality of image frames acquired respectively by said cameras, and when a pedestrian is present in the viewing zone viewed by one of said cameras, the image processor attached to said one camera identifies in at least one of the image frames at least a portion of an image of the detected pedestrian, thereby producing a detected pedestrian data object, and wherein said detected pedestrian data object is transferred from said one camera to another one of the cameras, thereby tracking the pedestrian.

17. The system of claim 16, further comprising:
   (c) providing a system processor which controls said plurality of cameras and notifies the vehicle operator on each detected pedestrian.

18. The method of claim 17, further comprising the step of:
(d) notifying the system processor by said image processor about said detected pedestrian, wherein the notification also includes said image processor identification code (ID).

19. The method of claim 17, wherein said system processor and said image processor share a common bus, and wherein said transferring of said detected pedestrian data object from said one camera to another one of the cameras is performed over said bus and wherein said transfer of said detected pedestrian data object is also transferred to said system processor.

20. The method of claim 16, wherein the viewing zones viewed respectively by said cameras encompass 360° horizontally around the vehicle.

21. The method of claim 16, wherein said tracking is performed horizontally over 360°.

22. The method of claim 16, wherein the distortion of each camera of said plurality of cameras is corrected.

23. The method of claim 16, wherein said data object comprises features selected from the group of features including distance, azimuth angle, size, time, color.

24. The method of claim 16, further comprising the steps of:
(e) computing the distance from the vehicle to said detected pedestrian; and
(f) computing the azimuth of said detected pedestrian relative to the track longitudinal axis.

25. The method of claim 24, wherein said computing the distance and said computing the azimuth are performed by said image processor.

26. The method of claim 24, wherein said computing the distance and said computing the azimuth are performed by said system processor.

27. The method of claim 16, further comprising a step of:
(g) tracking said detected pedestrian by said image processor.

28. The method of claim 24, further comprising a step of:
(g) tracking said detected pedestrian by said system processor.

29. The method of claim 26, further comprising the steps of:
(h) notifying the system processor by said image processor about said distance of each of said detected pedestrian, the notification also including said image processor ID; and
(i) notifying the system processor by said image processor about said azimuth of each of said detected pedestrian, the notification also including said image processor ID.

30. The method of claim 26, further comprising:
(j) activating a mechanism operatively attached to said system processor, said mechanism causing vehicle to slow down or stop, to avoid an accident.

31. The method of claim 24, wherein the position of each camera of said plurality of cameras with reference to the local external surface of vehicle is known in said computing of distance.

32. The method of claim 24, wherein the initial orientation of each camera of said plurality of cameras relative to the track longitudinal axis is known in said computing of azimuth.

33. The method of claim 17, wherein when a pedestrian is detected by two adjacent cameras of said plurality of cameras, stereo analysis is performed by said system processor to refine the distance computation to said detected pedestrian.

34. The method of claim 17, wherein when said notifying the vehicle operator on each of said detected pedestrian by said system processor comprise an audible notification.

35. The method of claim 34, wherein the volume of said audible notification is indicates the alarm level to the vehicle operator.

36. The method of claim 34, wherein the frequency of said audible notification indicates the alarm level to the vehicle operator.

37. The method of claim 34, wherein said audible notification is sound by a mono speaker, stereo speakers or surround speakers.

38. The method of claim 37, wherein said stereo speakers or surround speakers play said audible notification such that said audible notification is in the direction of said computed azimuth.

39. The method of claim 17, wherein when said notifying the vehicle operator on each of said detected pedestrian by said system processor comprise a visual notification.

40. The method of claim 39, wherein said visual notification is an indicator selected from the group of indicators including a light, colored lights, display.

41. The method of claim 40, wherein said colored lights indicate the alarm level to the vehicle operator.

42. The method of claim 40, wherein said display indicates the distance and azimuth of said detected pedestrian relative to the vehicle.

43. A system mounted on a powered industrial vehicle for detecting and classifying in real time at least one obstruction in the scene around the vehicle, the vehicle capable of moving in multiple directions, the system comprising:
(a) a plurality of cameras mounted on the vehicle; and
(b) a plurality of image processors operatively attached to each of said cameras, wherein said image processors each processes a plurality of image frames acquired respectively by said cameras, said image processors attach a respective camera unit identification code to each said image frames; and
(c) a system processor which controls said cameras and processes each of said image frames acquired respectively by said cameras and transferred to said system processor, and when a pedestrian is present in the viewing zone viewed by one of said cameras, said system processor identifies in at least one of the image frames at least a portion of an image of the detected pedestrian, thereby producing a detected pedestrian data object, and notifies the vehicle operator on each detected pedestrian, and wherein said detected pedestrian data object is transferred from said one camera to another one of the cameras, thereby tracking the pedestrian.

44. In a system mounted on a powered industrial vehicle for detecting and classifying in real time at least one obstruction in the scene around the vehicle, the vehicle capable of moving in multiple directions, a method comprising the steps of:
(a) a plurality of cameras mounted on the vehicle; and
(b) processing said at least one image by image processors operatively attached to each of said cameras, wherein said image processors each processes a plurality of image frames acquired respectively by said cameras, said image processors attach a respective camera unit identification code (ID) to each said image frames; and
(c) transferring said image frames with said respective ID to a system processor, wherein said system processor processes each of said image frames acquired respectively by said cameras and transferred to said system processor, and when a pedestrian is present in the viewing zone viewed by one of said cameras, said system processor identifies in at least one of said image frames at least a portion of an image of the detected pedestrian, thereby producing a detected pedestrian data object, and notifies the vehicle operator on each detected pedestrian.

45. The method of claim 44, wherein the viewing zones viewed respectively by said cameras encompass 360° horizontally around the vehicle.

46. The method of claim 44, further comprising the steps of:
(d) computing the distance from the vehicle to said detected pedestrian by said system processor; and
(e) computing the azimuth of said detected pedestrian relative to the track longitudinal axis by said system processor.

47. The method of claim 44, further comprising the steps of:
(f) tracking said detected pedestrian by said system processor.

48. The method of claim 47, wherein said tracking is performed horizontally over 360°.

49. The method of claim 44, further comprising the steps of:
(g) activating a mechanism operatively attached to said system processor, said mechanism causing vehicle to slow down or stop, to avoid an accident.

* * * * *